United States Patent
Tang et al.

(10) Patent No.: US 8,503,064 B2
(45) Date of Patent: Aug. 6, 2013

(54) TOUCH-ENABLED PLASMONIC REFLECTIVE DISPLAY

(75) Inventors: Liang Tang, Vancouver, WA (US); Akinori Hashimura, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 232 days.

(21) Appl. No.: 13/157,225

(22) Filed: Jun. 9, 2011

(65) Prior Publication Data

US 2012/0139958 A1 Jun. 7, 2012

Related U.S. Application Data

(63) Continuation-in-part of application No. 13/157,206, filed on Jun. 9, 2011, and a continuation-in-part of application No. 12/836,121, filed on Jul. 14, 2010, now Pat. No. 8,368,998, which is a continuation-in-part of application No. 12/646,585, filed on Dec. 23, 2009, now Pat. No. 8,223,425, which is a continuation-in-part of application No. 12/635,349, filed on Dec. 10, 2009, now Pat. No. 8,355,099, which is a continuation-in-part of application No. 12/621,567, filed on Nov. 19, 2009, now Pat. No. 8,339,543, which is a continuation-in-part of application No. 12/614,368, filed on Nov. 6, 2009, now Pat. No. 8,045,107.

(51) Int. Cl.
*G02B 26/00* (2006.01)

(52) U.S. Cl.
USPC .................................. 359/296; 359/245

(58) Field of Classification Search
USPC .................................................. 359/296
See application file for complete search history.

(56) References Cited

U.S. PATENT DOCUMENTS

| 2008/0144179 A1* | 6/2008 | Mimura et al. ............ 359/599 |
| 2009/0034055 A1* | 2/2009 | Gibson ...................... 359/296 |

FOREIGN PATENT DOCUMENTS

| JP | 2012022664 | 2/2012 |
| WO | WO 2011077981 | 6/2011 |

* cited by examiner

*Primary Examiner* — James Jones
(74) *Attorney, Agent, or Firm* — Law Office of Gerald Maliszewski; Gerald Maliszewski

(57) ABSTRACT

An electrical pressure-sensitive reflective display includes an array of display pixels, each with a transparent top surface, first electrode, second electrode, an elastic polymer medium, and metallic nanoparticles distributed in the elastic polymer medium. When a first voltage potential is applied between the first and second electrodes of each display pixel, a first color is reflected from the incident spectrum of light, assuming no pressure is applied on the top surface of each display pixel. When the top surface of a first display pixel is deformed in response to an applied pressure, the elastic polymer medium in the first display pixel is compressed, decreasing the metallic nanoparticle-to-metallic nanoparticle mean distance in the first display pixel. In response to decreasing the metallic nanoparticle-to-metallic nanoparticle mean distance, the color reflected from the incident spectrum of light by the second display pixel is changed from the first color to second color.

21 Claims, 6 Drawing Sheets

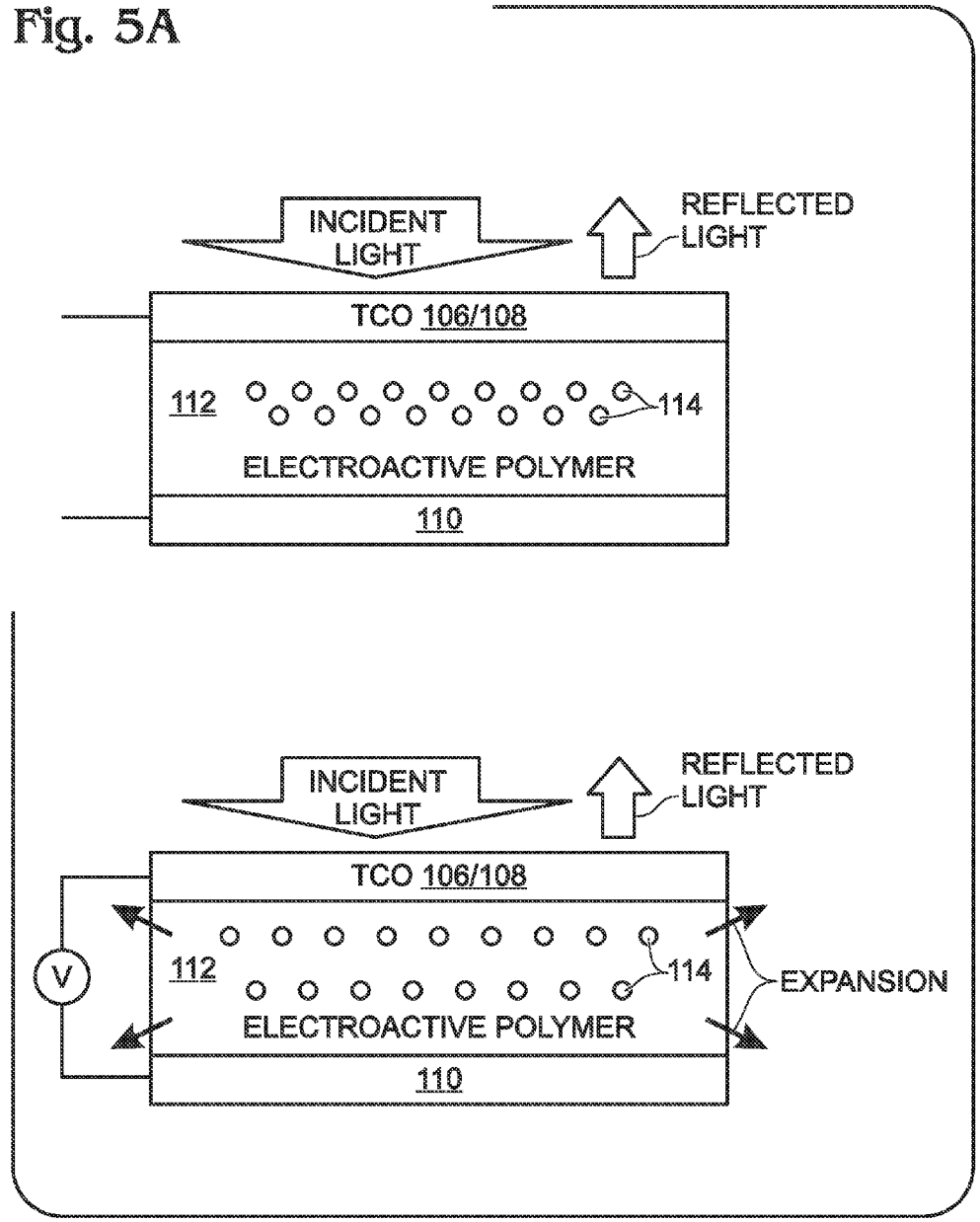

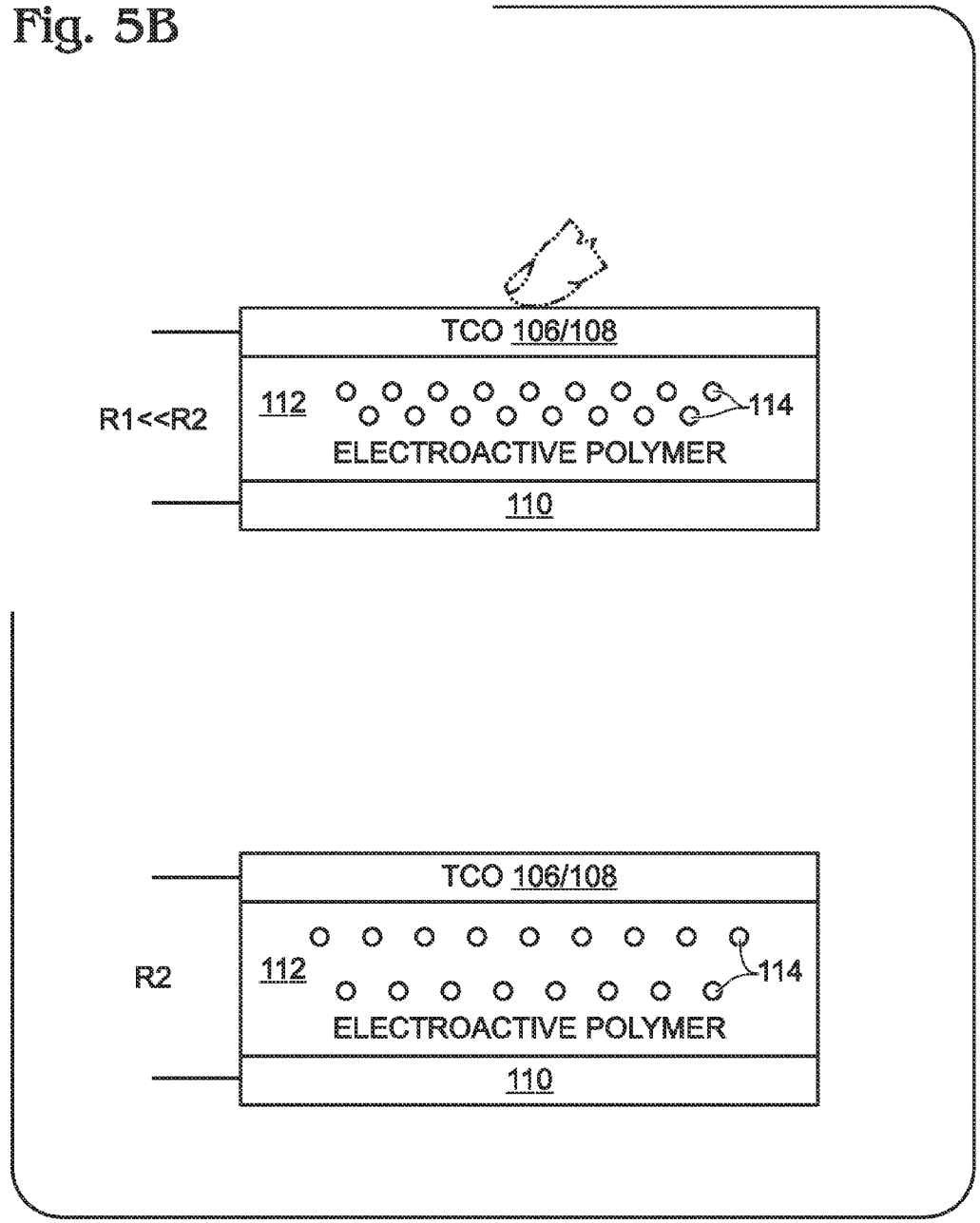

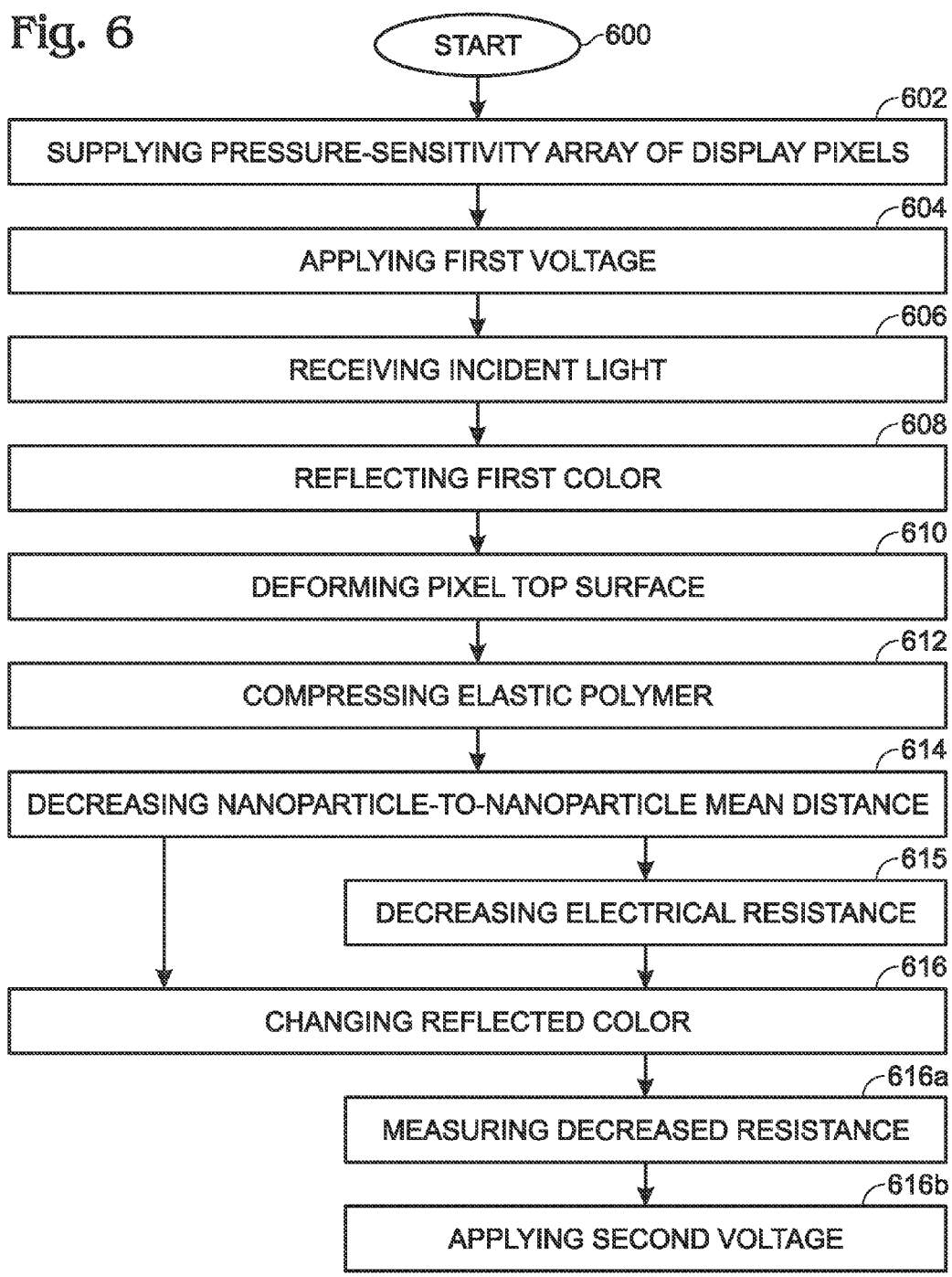

TOUCH-ENABLED PLASMONIC REFLECTIVE DISPLAY

RELATED APPLICATIONS

The application is a Continuation-in-Part of a pending application entitled, METALLIC NANOPARTICLE PRESSURE SENSOR, invented by A. Hashimura et al., Ser. No. 13/157,206, filed on Jun. 9, 2011.

The application is also a Continuation-in-Part of a application entitled, PLASMONIC ELECTRONIC SKIN, invented by L. Tang et al., Ser. No. 12/836,121, filed on Jul. 14, 2010, now U.S. Pat. No. 8,368,998;

which is a Continuation-in-Part of a application entitled, PLASMONIC DEVICE TUNED USING PHYSICAL MODULATION, invented by L. Tang et al., Ser. No. 12/646,585, filed on Dec. 23, 2009, now U.S. Pat. No. 8,223,425;

which is a Continuation-in-Part of a application entitled, PLASMONIC DEVICE TUNED USING LIQUID CRYSTAL MOLECULE DIPOLE CONTROL, invented by L. Tang et al., Ser. No. 12/635,349, filed on Dec. 10, 2009, now U.S. Pat. No. 8,355,099;

which is a Continuation-in-Part of a application entitled, PLASMONIC DEVICE TUNED USING ELASTIC AND REFRACTIVE MODULATION MECHANISMS, invented by L. Tang et al., Ser. No. 12/621,567, filed on Nov. 19, 2009, now U.S. Pat. No. 8,339,543;

which is a Continuation-in-Part of a application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009, now U.S. Pat. No. 8,045,107. All the above-referenced applications are incorporated herein by reference.

BACKGROUND OF THE INVENTION

1. Field of the Invention

This invention generally relates to electronic displays and, more particularly, to a pressure-sensitive plasmonic reflective display.

2. Description of the Related Art

Reflective displays are an attractive technology because they consume substantially less power than liquid crystal displays (LCDs) and organic light-emitting device (OLED) displays. A typical LCD used in a laptop or cellular phone requires an internal (backlight) illumination to render a color image. In most operating conditions the internal illumination that is required by these displays is in constant competition with the ambient light of the surrounding environment. Thus, the already available light energy provided by the surroundings is wasted, and the operation of these displays requires additional power to overcome this ambient light. In contrast, reflective display technology makes good use of the ambient light so the display consumes substantially less power.

Touch-panels have becoming ubiquitous in mobile phones and tablet computers, such as the iPod, iPhone and iPad, to name a few examples. Touch recognition is now an essential capability in most display technologies. It would be desirable to enable touch capability for reflective displays, which does not exist today. However, integrating conventional capacitive or resistive touch panels into a reflective display would substantially lower the light reflectance and increase system complexities of a typical reflective display.

It would be advantageous if the display pixels of a reflective technology display could be made touch-sensitive.

SUMMARY OF THE INVENTION

Described herein is a reflective display technology with touch-recognition capability. The basic structure is a nanocomposite film with embedded plasmonic nanoparticles, sandwiched between two transparent-conductor layers. The plasmonic nanoparticles play two roles simultaneously: optically they can be tuned to reflect ambient light of different wavelengths that is seen as colors, and electrically they conduct current of different levels, showing different resistances when touched. The design has a simple architecture because the same nanocomposite film is used for both reflective-display and touch-panel functions, substantially reducing the system complexities while maintaining a high reflectivity. The design inherits the advantages of both plasmonic displays and plasmonic pressure sensors: high-reflectance excellent-color and extremely-high touch-sensitivity.

Accordingly, a method is provided for changing the reflected colors of a pressure-sensitive array of display pixels. An electrical pressure-sensitive reflective display includes an array of display pixels. Each display pixel includes a sealed chamber with a transparent top surface, first electrode, second electrode, an elastic polymer medium, and metallic nanoparticles distributed in the elastic polymer medium. When a first voltage potential is applied between the first and second electrodes of each display pixel and a visible spectrum light is received at the top surface of each display pixel, a first color is reflected from the incident spectrum of light, assuming no pressure is applied on the top surface of each display pixel. When the top surface of a first display pixel is deformed in response to an applied pressure, the elastic polymer medium in the first display pixel is compressed, decreasing the metallic nanoparticle-to-metallic nanoparticle mean distance in the first display pixel. In response to decreasing the metallic nanoparticle-to-metallic nanoparticle mean distance, the color reflected from the incident spectrum of light by the second display pixel is changed from the first color to second color, different than the first color.

In one aspect, the electrical resistance between the first and second electrodes of the first display pixel through the elastic polymer medium is decreased in response to decreasing the metallic nanoparticle-to-metallic nanoparticle mean distance in the first display pixel. This decrease in resistance between the first and second electrodes of the first display pixel is measured and a second voltage potential is applied between the first and second electrodes of a second display pixel, different than the first voltage potential.

Additional details of the above-described method and a pressure-sensitive array of display pixels are presented below.

BRIEF DESCRIPTION OF THE DRAWINGS

FIGS. 5A and 5B are partial cross-sectional views of a display pixel featuring, respectively, optical and electrical characteristics.

FIG. 6 is a flowchart illustrating a method for changing the reflected colors of a pressure-sensitive array of display pixels.

DETAILED DESCRIPTION

Figure 1:
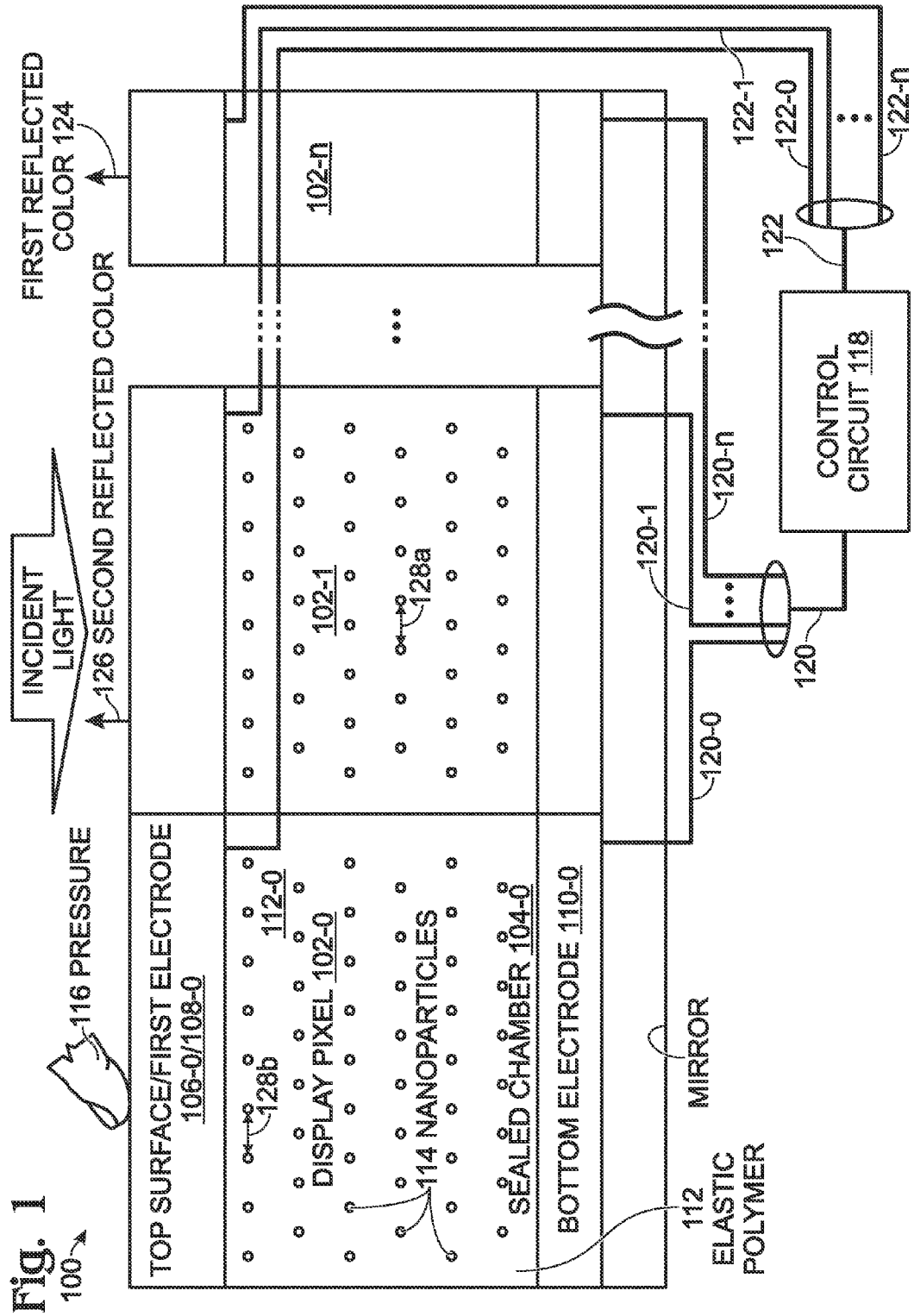
FIG. 1 is a partial cross-sectional view of a pressure-sensitive array of display pixels.

FIG. 1 is a partial cross-sectional view of a pressure-sensitive array of display pixels. The array 100 comprises a plurality of display pixels 102. Here, one row or sequence of display pixels is shown, 102-0 through 102-n, where n is an integer not limited to any particular value. Although it cannot be seen in this view, the array comprises a plurality of display pixel rows. Taking display pixel 102-0 as an example, each display pixel 102 includes a sealed chamber 104 with a top surface 106, a first electrode 108, and a second electrode 110. An elastic polymer medium 112, with distributed metallic nanoparticles 114, at least partially fills the sealed chamber 104 and is in contact with the first and second electrodes 108/110 when the top surface 106 is deformed by an applied pressure. For example, the elastic polymer medium 112 may be polymer network liquid crystal (PNLC) and the metallic nanoparticles 114 may be Ag, Al, Pt, Cu, Au, or combinations of the above-listed metal materials. The top electrode 108 and bottom electrode 110 are a transparent electrically conductive material such as indium tin oxide (ITO) or a thin metal layer, to name a few examples.

A control circuit 118 has an input on line 120 to accept resistance measurements between the first and second electrodes of each display pixel 102, and an output on line 122 to supply a voltage potential to the first and second electrodes of each display pixel. Note: there are a number of means well known in the art to measurement resistance, including current and voltage measurements. Depending upon the method used, the lines used to measurement resistance and supply voltage may be the same or different lines.

The top surface 106 of each display pixel 102 reflects a first color 124 of visible spectrum incident light in response to a first voltage potential supplied by the control circuit 118 when no pressure is applied to the top surface, e.g., see display pixel 102-n. When a first pressure 116 is applied to the top surface 106-0 of a first display pixel 102-0, the control circuit 118 measures a first resistance between the first and second electrodes 108-0/110-0 of a, first display pixel 102-0. The control circuit 118 supplies a second voltage potential to a second display pixel 102-1 in response to the measurement of the first resistance. The top surface 106-1 of the second display pixel 102-1 reflects a second color 126 of visible spectrum incident light in response to the second voltage potential applied between the first and second electrodes 108-1/110-1. For example, the control circuit may change the color of the second display pixel 102-1 as a feedback mechanism, to show the user that a "touch" has been measured on adjacent display pixel 102-0. Alternatively, the control circuit may represent a software application, or combination of applications, that changes a graphic user interface (GUI) as a result of the user selecting a touch-sensitive "button" represented by the first pixel 102-0. It should also be understood that a user may simultaneously apply pressure to a plurality of adjacent display pixels, and that the control circuit may change the color reflected by a plurality of display pixels adjacent the touched display pixels.

In one aspect, the control circuit 118 measures a second electrical resistance between the first and second electrodes 108-0/110-0 of the first display pixel 102-0, when no pressure is applied to the top surface 106-0, where the second resistance is greater than the first resistance. Each display pixel 106 has a metallic nanoparticle-to-metallic nanoparticle mean distance 128 that decreases in responsive to applied pressure on the top surface 106. Thus, the control circuit 118 measures a first resistance less than the second resistance as a result of decreased metallic nanoparticle-to-metallic nanoparticle mean distance 128.

In one aspect, as shown in FIG. 1, the sealed chamber 104 of each display pixel 102 has a bottom surface 130. The first electrode 108 is formed in the top surface 106, and the second electrode 110 is formed on the bottom surface of the sealed chamber.

Figure 2:
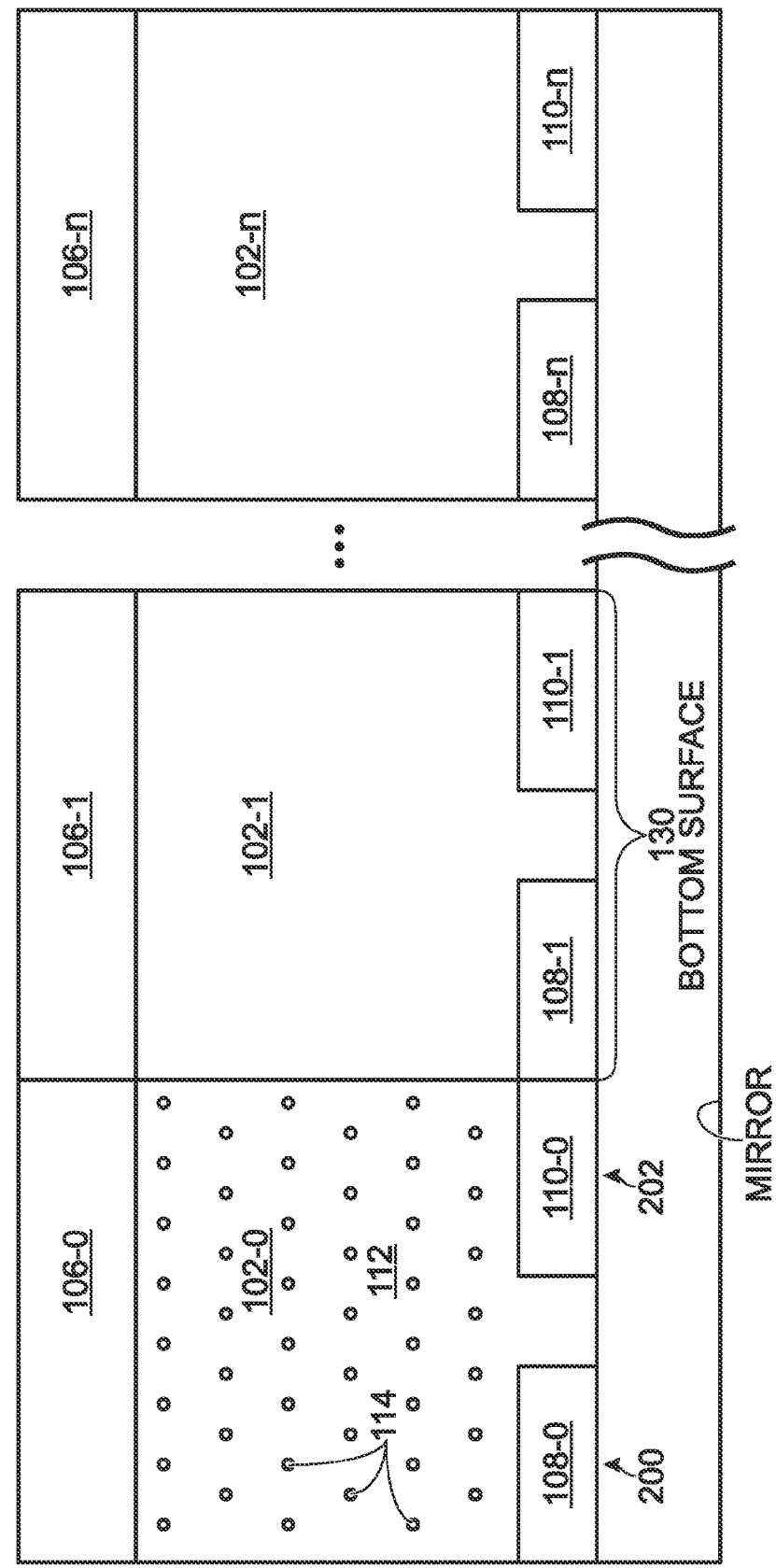
FIG. 2 is a partial cross-sectional view depicting a variation of the display pixel array of FIG. 1.

FIG. 2 is a partial cross-sectional view depicting a variation of the display pixel array of FIG. 1. In this aspect, the sealed chamber 104 of each display pixel 102 has a bottom surface 130 with a first portion 200 separated from a second portion 202. The first electrode 108 is formed in the first portion 200 of the bottom surface 130 of the sealed chamber 104, and the second electrode 110 is formed in the second portion 202 of the bottom surface of the sealed chamber.

Referencing either FIG. 1 or FIG. 2, each display pixel 102 has a metallic nanoparticle-to-metallic nanoparticle first mean distance 128a of greater than 10 nanometers (nm), with no pressure applied to the top surface 106. Applied pressure may result in a metallic nanoparticle-to-metallic nanoparticle second mean distance 128b of less than 10 nm. Alternatively, each display pixel 102 has a metallic nanoparticle fill volume of less than about 20% in the elastic polymer medium, with no pressure applied to the top surface, and a fill volume percentage of greater than about 25%, with pressure applied to the top surface 106.

The metallic nanoparticles 114 of each display pixel 102 conduct electric field assisted tunneling between the first and second electrodes 108/110 when the top surface 106 is deformed by applied pressure, as follows:

$$I = K * e * V * \exp\left(-2 * \frac{\sqrt{2*m*\phi}}{h} * d\right)$$

where K=a constant;
V=a bias voltage between the first and second electrodes;
m=electron mass;
e=electron charge;
Φ=work function;
h=reduced Plank's constant; and,
d=particle-to-particle mean distance.

From this equation, a work function of ~4 eV can be estimated, assuming silver nanoparticles are used. The tunneling current reduces by a factor of 10 for a 0.1 nm increase in particle-to-particle mean distance.

Functional Description

Plasmons, which are quantized oscillations of the free electron gas in a metal or other material, affect how light interacts with a structure and thereby determine the apparent color of the structure. This generally occurs through the coupling of surface plasmons with light to form surface plasmon-polaritons. Tuning the color of a metal nanostructure is possible because the plasmon resonant frequency of such structures generally depends on the size, shape, spacing, and the dielectric properties of the surrounding material. Thus, the optical absorption and scattering spectra (and therefore the color) of a metal structure can be varied by altering any one or more of these characteristics.

Nanoparticle spacing can be "tuned" because it is relatively easy to implement in an elastic polymeric material. With tunable particle spacing, plasmon resonances in metal nanostructures provide tunable optical scattering or absorbing mechanisms for binary or continuous color variation suitable for use in still image and video displays. The metal nanostructures can be a random or ordered array of metal nanoparticles with a variety of shapes, including but not limited to nanospheres, nano-disks, nano-shells, nano-eggs, nano-cups, nanorods, nano-pyramids, nano-stars, etc. They can also be particles with a dielectric core but metallic coating, or any such combinations. The distance between each nanoparticle is on the order of an optical wavelength or below the wavelength. When the particles are sufficiently far away from each other, each particle functions as a discrete structure with the scattering property of the array resembling that of each individual particle. When the particles are close together, e.g. closely-packed in a particular order into a plasmonic lattice, the particles couple together electromagnetically, which results in very different scattering property of the array.

The metals used can be gold, silver, aluminum, platinum, or their alloys, or any other material that has a large negative real permittivity and small imaginary permittivity at the wavelengths of interest. Ag has a strong plasmonic response across visible and near infrared (IR) wavelength range, while other materials support a strong resonance only in a specific wavelength range. Some plasmonic materials, such as copper, have an absorbing oxide layer that strongly damps the plasmonic resonance. This oxide layer must be removed to restore a narrow resonance linewidth by using, e.g. glacial acetic acid.

The shape of the nanoparticle extinction and scattering spectra, and in particular the peak wavelength, depends on nanoparticle composition, size, shape, orientation, and local dielectric environment. The plasmonic resonance can be tuned during fabrication by controlling these parameters with a variety of chemical syntheses and lithographic techniques.

Figure 3:
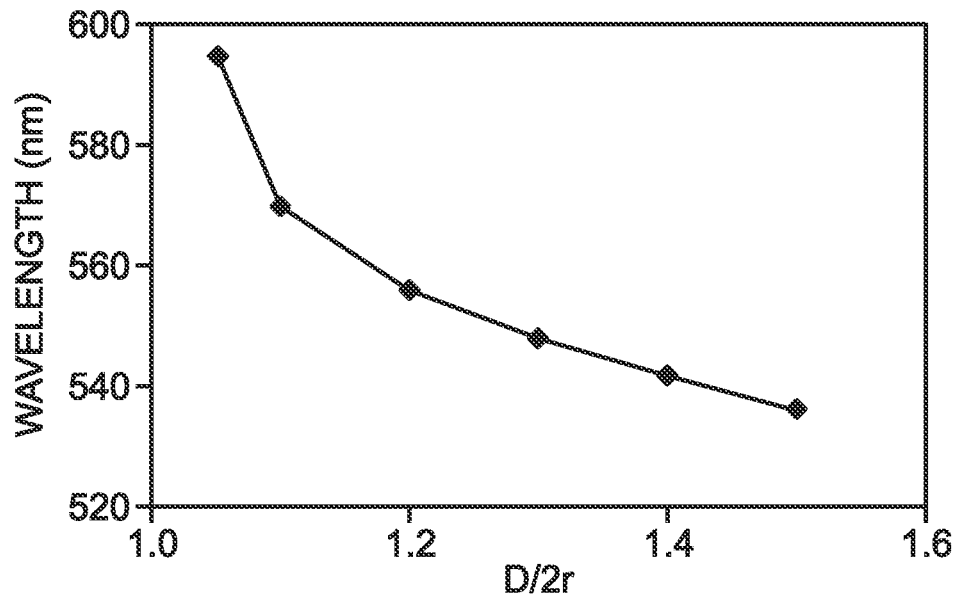
FIG. 3 is a graph depicting simulated results for an array of Au nanospheres embedded in a polymer (n=1.4), showing the dependence of resonance peak position on the spacing-to-radius ratio.

FIG. 3 is a graph depicting simulated results for an array of Au nanospheres embedded in a polymer (n=1.4), showing the dependence of resonance peak position on the spacing-to-radius ratio. The array spacing D is the distance between the centers of the first nearest-neighbor nanospheres. r is the radius of each nanosphere. Under this scenario, the resonant wavelength shifts to longer wavelengths as the distance between the nanoparticles become smaller. The magnitude of the shift within this range is 60 nm, which corresponds to a shift from green to red colors.

Figure 4:
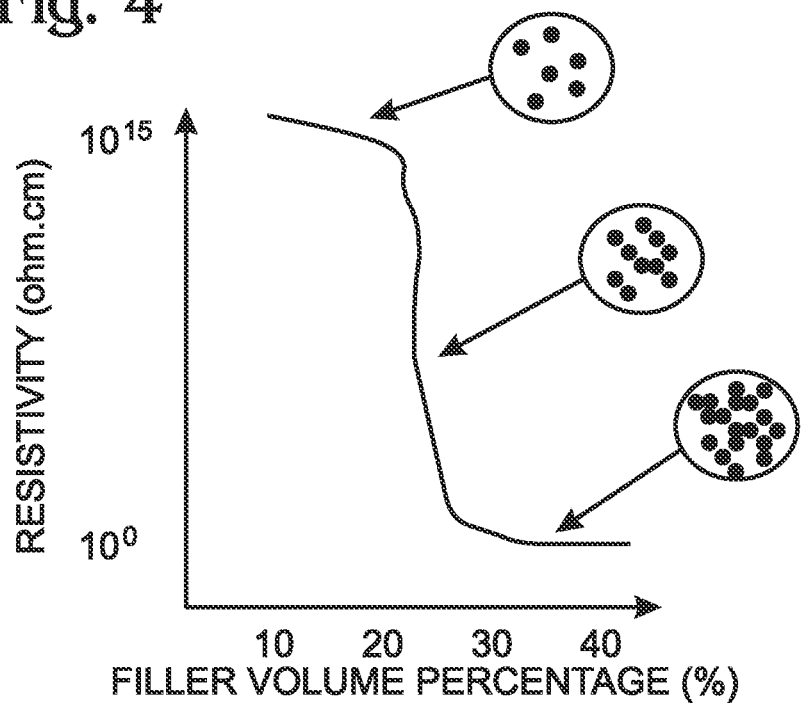
FIG. 4 is a graph depicting the relationship between metallic nanoparticle fill volume and resistance.

FIG. 4 is a graph depicting the relationship between metallic nanoparticle fill volume and resistance. Polymer-metal composites consist of two components, a polymer matrix and a filler (i.e. metal nanoparticles). The conductivity depends critically on the volume ratio of the filler. For very low filler fractions, the mean distance between conducting particles is large and the conductance is limited by the polymer matrix, which has typically a conductivity in the order of $10e^{-15} ohm^{-1} cm^{-1}$, as shown. When a sufficient amount of filler is loaded, the filler particles get closer and form linkages, which results in an initial conducting path through the whole material. The corresponding filler content is called the percolation threshold. In this concentration range, the conductivity can change drastically by several orders of magnitude for small variations of the filler content. Finally, at high loading of the filler, the increasing number of conducting paths forms a three-dimensional network. In this range the conductivity is high and less sensitive to small changes in volume fraction.

The process of charge carrier transport can be divided into two steps, the injection of charge carriers into the material (e.g., Fowler-Nordheim or Richardson-Schottky transmission types) and the motion of charge carriers through the material via hopping, tunneling, ballistic transport, diffusion, or metallic conduction. In two-phase composites four different conduction aspects have to be taken into account: the conduction in the polymer matrix, in the filler material, between adjacent filler particles, and from the filler into the matrix and vice versa. Three different regimes of charge carrier transport are possible:

First, for composites with very low filler ratio well below the percolation threshold, it is expected that the mean distance between conducting particles is large and no conducting paths throughout the whole composite are established. The mean separation distance of next neighbor filler particles is larger than 10 nm, which means that even tunneling from particle to particle cannot take place. In this case, the composite conductivity is the result of transport processes within the polymer host matrix. Therefore, the loading has at low fields little effect on the electrical conductivity of the entire composite.

In the second case, the filler-particles are still well separated, but their mean distance is below a certain threshold mean particle-particle distance. In this case electrical field assisted tunneling can occur between neighboring particles. The following equation gives an expression of the electrical field dependence of the tunneling current.

$$j_{Tunneling} = A \cdot E^n \cdot \exp\left(-\frac{B}{E}\right)$$

The factor $\exp(-B/E)$ characterizes the transition probability of charge carriers from the filler into the polymer and vice versa. The value B is a measure of the energy barrier between the polymer and the filler material.

Finally, at sufficiently high loading the conducting filler particles are in close contact, touching each other. The conduction of charge carriers occurs through the continuous structure of the chain of filler particles in the polymer matrix. The conductivity is mainly determined by the filler material and its microscopic contacts to adjacent filler particles.

FIGS. 5A and 5B are partial cross-sectional views of a display pixel featuring, respectively, optical and electrical characteristics. In FIG. 5A, the display pixel reacts optically by reflecting different colors of light as a result different physical spacings between the metallic nanoparticles. In FIG. 5B, the display pixel reacts electrically as the metal nanoparticle-polymer composite changes resistance under pressure.

As discussed above, metal nanoparticles embedded in a polymer can function as both optically and electrically active medium leading to tunable reflective colors and tunable resistances. Optically, metal nanoparticles reflect different colors of light with different physical spacing of particles. This spacing can be controlled by an external bias voltage which controls the expansion and contraction of the electroactive polymer. Additional details of plasmonic displays can be found in the parent applications referenced in the Related Applications Section, above. Electrically, as pressed by fingers or other touching objects, the physical spacing of nanoparticles can be changed, leading to dramatic change of resistance measured across the top and bottom electrodes. Note that the metal particles for these two different functions can have different sizes, different fill densities, and be located in different regions or layers of a display, providing sufficient flexibility for a novel touch-enabled reflective display or electronic-skin.

FIG. 6 is a flowchart illustrating a method for changing the reflected colors of a pressure-sensitive array of display pixels. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

Step 602 provides an electrical pressure-sensitive array of display pixels. Each display pixel includes a sealed chamber with a transparent top surface, first electrode, second electrode, an elastic polymer medium, and metallic nanoparticles distributed in the elastic polymer medium. For example, a polymer network liquid crystal (PNLC) medium may be used with metallic nanoparticles such as Ag, Al, Pt, Cu, or Au, separated by a mean distance of greater than 10 nm when no pressure is applied to display pixel top surfaces.

Step 604 applies a first voltage potential between the first and second electrodes of each display pixel. Step 606 receives visible spectrum light at the top surface of each display pixel. With no pressure applied on the top surface of each display pixel, Step 608 reflects a first color from the incident spectrum of light. Step 610 deforms the top surface of a first display pixel in response to an applied pressure. Step 612 compresses the elastic polymer medium in the first display pixel. Step 614 decreases the metallic nanoparticle-to-metallic nanoparticle mean distance in the first display pixel. In response to decreasing the metallic nanoparticle-to-metallic nanoparticle mean distance, Step 616 changes the color reflected from the incident spectrum of light by a second display pixel, from the first color to second color, different than the first color.

In one aspect, in response to decreasing the metallic nanoparticle-to-metallic nanoparticle mean distance in the first display pixel, Step 615 decreases electrical resistance between the first and second electrodes of the first display pixel through the elastic polymer medium. Then, changing the color reflected by the second display pixel in Step 616 includes substeps. Step 616a measures the decrease in resistance between the first and second electrodes of the first display pixel. Step 616b applies a second voltage potential between the first and second electrodes of the second display pixel, different than the first voltage potential.

In one aspect, Step 606 provides each display pixel with the first electrode formed in the top surface and the second electrode formed on a bottom surface of the sealed chamber. Alternatively, each display pixel has the first electrode formed in a first portion of a bottom surface of the sealed chamber and the second electrode formed in a second portion of the bottom surface, where the first portion is separated from the second portion.

In another aspect, Step 602 provides each display pixel with a metallic nanoparticle-to-metallic nanoparticle first mean distance of greater than 10 nm, with no pressure applied to the top surface. Then, decreasing the metallic nanoparticle-to-metallic nanoparticle mean distance in Step 614 includes decreasing the metallic nanoparticle-to-metallic nanoparticle mean distance to a second mean distance, of less than 10 nm.

In a different aspect, Step 602 provides display pixels with a metallic nanoparticle fill volume of less than about 20% in the elastic polymer medium. Then, decreasing the metallic nanoparticle-to-metallic nanoparticle to the second mean distance in Step 614 includes creating a metallic nanoparticle fill volume percentage of greater than about 25%.

In a different aspect, decreasing the resistance in Step 615 includes decreasing resistance as a result of electric field assisted tunneling between adjacent metallic nanoparticles. In one aspect, the resistance decreases as a result of microscopic contacts between adjacent metallic nanoparticles. In another aspect, the resistance decreases by creating a current as follows:

$$I = K*e*V*\exp\left(-2*\frac{\sqrt{2*m*\phi}}{h}*d\right)$$

where K=a constant;
V=a bias voltage between the first and second electrodes;
m=electron mass;
e=electron charge;
Φ=work function;
h=reduced Plank's constant; and,
d=particle-to-particle mean distance.

A display and method for changing the reflected colors of a pressure-sensitive array of display pixels have been provided. Examples of particular structures and materials have been presented to illustrate the invention. However, the invention is not limited to merely these examples. Other variations and embodiments of the invention will occur to those skilled in the art.

The invention claimed is:

1. A method for changing the reflected colors of a pressure-sensitive array of display pixels, the method comprising:
   providing an electrical pressure-sensitive array of display pixels, each display pixel including a sealed chamber with a transparent top surface, first electrode, second electrode, an elastic polymer medium, and metallic nanoparticles distributed in the elastic polymer medium;
   applying a first voltage potential between the first and second electrodes of each display pixel;
   receiving visible spectrum light at the top surface of each display pixel;
   with no pressure applied on the top surface of each display pixel, reflecting a first color from the incident spectrum of light;
   deforming the top surface of a first display pixel in response to an applied pressure;
   compressing the elastic polymer medium in the first display pixel;
   decreasing a metallic nanoparticle-to-metallic nanoparticle mean distance in the first display pixel; and,
   in response to decreasing the metallic nanoparticle-to-metallic nanoparticle mean distance, changing the color reflected from the incident spectrum of light by a second display pixel, from the first color to second color, different than the first color.

2. The method of claim 1 further comprising:
   in response to decreasing the metallic nanoparticle-to-metallic nanoparticle mean distance in the first display pixel, decreasing electrical resistance between the first and second electrodes of the first display pixel through the elastic polymer medium.

3. The method of claim 2 wherein changing the color reflected by the second display pixel includes:
   measuring the decrease in resistance between the first and second electrodes of the first display pixel; and,
   applying a second voltage potential between the first and second electrodes of the second display pixel, different than the first voltage potential.

4. The method of claim 1 wherein providing the electrical pressure-sensitive array of display pixels includes providing each display pixel with the first electrode formed in the top surface and the second electrode formed on a bottom surface of the sealed chamber.

5. The method of claim 1 wherein providing the electrical pressure-sensitive array of display pixels includes providing each display pixel with the first electrode formed in a first portion of a bottom surface of the sealed chamber and the second electrode formed in a second portion of the bottom surface, where the first portion is separated from the second portion.

6. The method of claim 2 wherein providing the electrical pressure-sensitive array of display pixels includes providing each display pixel with a metallic nanoparticle-to-metallic nanoparticle first mean distance of greater than 10 nanometers (nm), with no pressure applied to the top surface; and,
   wherein decreasing the metallic nanoparticle-to-metallic nanoparticle mean distance includes decreasing the metallic nanoparticle-to-metallic nanoparticle mean distance to a second mean distance, of less than 10 nm.

7. The method of claim 6 wherein decreasing electrical resistance between the first and second electrodes of the first display pixel includes decreasing electrical resistance as a result of electric field assisted tunneling between adjacent metallic nanoparticles.

8. The method of claim 6 wherein decreasing electrical resistance between the first and second electrodes of the first display pixel includes decreasing electrical resistance as a result of microscopic contacts between adjacent metallic nanoparticles.

9. The method of claim 7 wherein decreasing electrical resistance between the first and second electrodes of the first display pixel includes decreasing electrical resistance by creating a current as follows:

$$I = K*e*V*\exp\left(-2*\frac{\sqrt{2*m*\phi}}{h}*d\right)$$

where K=a constant;
V=a bias voltage between the first and second electrodes;
m=electron mass;
e=electron charge;
Φ=work function;
h=reduced Plank's constant; and,
d=particle-to-particle mean distance.

10. The method of claim 6 wherein providing the electrical pressure-sensitive array of display pixels with the metallic nanoparticle-to-metallic nanoparticle first mean distance includes providing a metallic nanoparticle fill volume of less than about 20% in the elastic polymer medium.

11. The method of claim 10 wherein decreasing the metallic nanoparticle-to-metallic nanoparticle to the second mean distance includes creating a metallic nanoparticle fill volume percentage of greater than about 25%.

12. The method of claim 1 wherein providing the electrical pressure-sensitive array of display pixels including providing a polymer network liquid crystal (PNLC) medium and metallic nanoparticles selected from a group consisting of Ag, Al, Pt, Cu, and Au, separated by a mean distance of greater than 10 nm when no pressure is applied to display pixel top surfaces.

13. A pressure-sensitive array of display pixels comprising:
  a plurality of display pixels, each display pixel including:
    a sealed chamber with a top surface;
    a first electrode;
    a second electrode;
    an elastic polymer medium, with distributed metallic nanoparticles, at least partially filling the sealed chamber and in contact with the first and second electrodes when the top surface is deformed by an applied pressure;
  a control circuit having an input to accept resistance measurements between the first and second electrodes of each display pixel, and an output to supply a voltage potential to the first and second electrodes of each display pixel;
  wherein the top surface of each display pixel reflects a first color of visible spectrum incident light in response to a first voltage potential supplied by the control circuit when no pressure is applied to the top surface;
  wherein a first pressure is applied to the top surface of a first display pixel;
  wherein the control circuit measures a first resistance between the first and second electrodes of a first display pixel in response to the first applied pressure, and supplies a second voltage potential to a second display pixel inn response to the measurement of the first resistance; and,
  wherein the top surface of the second display pixel reflects a second color of visible spectrum incident light in response to the second voltage potential applied between the first and second electrodes.

14. The pressure-sensitive array of display pixels of claim 13 wherein the control circuit measures a second electrical resistance between the first and second electrodes of the first display pixel, when no pressure is applied to the top surface, where the second resistance is greater than the first resistance.

15. The pressure-sensitive array of display pixels of claim 14 wherein each display pixel has a metallic nanoparticle-to-metallic nanoparticle mean distance that decreases in responsive to applied pressure on the top surface; and,
  wherein the control circuit measures a first resistance less than the second resistance as a result of decreased metallic nanoparticle-to-metallic nanoparticle mean distance.

16. The pressure-sensitive array of display pixels of claim 13 wherein the sealed chamber of each display pixel has a bottom surface;
  wherein the first electrode is formed in the top surface; and,
  wherein the second electrode is formed on the bottom surface of the sealed chamber.

17. The pressure-sensitive array of display pixels of claim 13 wherein the sealed chamber of each display pixel has a bottom surface with a first portion separated from a second portion;
  wherein the first electrode is formed in the first portion of the bottom surface of the sealed chamber; and,
  wherein the second electrode is formed in the second portion of the bottom surface of the sealed chamber.

18. The pressure-sensitive array of display pixels of claim 13 wherein each display pixel has a metallic nanoparticle-to-metallic nanoparticle first mean distance of greater than 10 nanometers (nm), with no pressure applied to the top surface.

19. The pressure-sensitive array of display pixels of claim 13 wherein each display pixel has a metallic nanoparticle fill volume of less than about 20% in the elastic polymer medium, with no pressure applied to the top surface, and a fill volume percentage of greater than about 25%, with pressure applied to the top surface.

20. The pressure-sensitive array of display pixels of claim 13 wherein each display pixel elastic polymer medium is polymer network liquid crystal (PNLC) and the metallic nanoparticles are selected from a group consisting of Ag, Al, Pt, Cu, and Au.

21. The pressure-sensitive array of display pixels of claim 13 wherein each display pixel includes metallic nanoparticles conducting an electric field assisted tunneling between the first and second electrodes when the top surface is deformed by applied pressure, as follows:

$$I = K*e*V*\exp\left(-2*\frac{\sqrt{2*m*\phi}}{h}*d\right)$$

where K=a constant;
V=a bias voltage between the first and second electrodes;
m=electron mass:
e=electron charge;
Φ=work function:
h=reduced Plank's constant; and,
d=particle-to-particle mean distance.

* * * * *